US008209819B2

(12) United States Patent
Rhee

(10) Patent No.: US 8,209,819 B2
(45) Date of Patent: Jul. 3, 2012

(54) HOOK AND EYE FASTENER

(76) Inventor: Donald Seung-Yeup Rhee, Los Angeles, CA (US)

( * ) Notice: Subject to any disclaimer, the term of this patent is extended or adjusted under 35 U.S.C. 154(b) by 369 days.

(21) Appl. No.: 11/952,813

(22) Filed: Dec. 7, 2007

(65) Prior Publication Data

US 2009/0144952 A1   Jun. 11, 2009

(51) Int. Cl.
*A44B 13/00* (2006.01)

(52) U.S. Cl. .................. 24/3.12; 24/578.14; 24/255.12; 24/DIG. 42; 24/DIG. 51

(58) Field of Classification Search .................. None
See application file for complete search history.

(56) References Cited

U.S. PATENT DOCUMENTS

| 783,450 | A | * | 2/1905 | Miller ........................... 24/601.4 |
|---|---|---|---|---|
| 954,458 | A | | 4/1910 | Patterson |
| 983,167 | A | | 1/1911 | Poalk |
| 1,107,750 | A | | 8/1914 | Boye |
| 1,257,026 | A | * | 2/1918 | Rundus ........................ 24/601.4 |
| 1,365,670 | A | | 1/1921 | Ellison |
| 2,016,733 | A | * | 10/1935 | Wener ........................... 24/601.7 |
| 3,162,919 | A | | 12/1964 | Shee |
| 3,839,739 | A | * | 10/1974 | Engel ................................. 2/232 |
| 4,288,890 | A | * | 9/1981 | Kanazaka .......................... 24/689 |
| 4,604,856 | A | * | 8/1986 | Schneider et al. ................. 54/76 |
| 4,625,370 | A | * | 12/1986 | Fukuroi et al. ............... 24/601.7 |
| 4,891,868 | A | | 1/1990 | Watanabe |
| 6,694,526 | B1 | * | 2/2004 | Tate ............................... 2/209.12 |
| 2006/0053836 | A1 | * | 3/2006 | Hines, Jr. .......................... 63/20 |

FOREIGN PATENT DOCUMENTS

| JP | 58-041210 A | 3/1983 |
|---|---|---|
| JP | 60-112908 | 7/1985 |
| JP | 61-068707 A | 5/1986 |

OTHER PUBLICATIONS

International Search Report and Written Opinion, 11 pages, 2009.

* cited by examiner

*Primary Examiner* — Jack W. Lavinder
(74) *Attorney, Agent, or Firm* — Patent Law Group LLP; David C. Hsia

(57) ABSTRACT

A hook and eye fastener includes a hook and an eye. The hook has a hook top plate and a hook base plate with a kinked end that curves toward the top plate and then curves away from the top plate. The kinked end is spring-loaded to rest on the hook top plate. The eye has an eye comprising a eye top plate and an eye base plate defining an opening for receiving the hook top plate. When the hook is initially inserted into the eye, the eye top plate pushes up against the kinked end of the hook base plate. When the kinked end slides past the eye top plate after the hook is fully inserted into the eye, the kinked end of the hook base plate snaps back down against the hook top plate and produces an audible sound to indicate the fastener is secured.

8 Claims, 2 Drawing Sheets

HOOK AND EYE FASTENER

FIELD OF INVENTION

This invention relates to hook and eye fasteners.

DESCRIPTION OF RELATED ART

A hook and eye fastener consists of a small hook that is inserted in a corresponding loop. Hook and eye fastener is traditionally used to fasten fabrics and clothing under tension in one direction only, such as the two ends of a bra or a waistband on a pair of pants.

SUMMARY

In one embodiment of the invention, a hook and eye fastener includes a hook and an eye. The hook has a hook top plate and a hook base plate with a kinked end that curves toward the top plate and then curves away from the top plate. The kinked end is spring-loaded to rest on the hook top plate. The eye has an eye comprising an eye top plate and an eye base plate defining an opening for receiving the hook top plate. When the hook is initially inserted into the eye, the eye top plate pushes up against the kinked end of the hook base plate. When the kinked end slides past the eye top plate after the hook is fully inserted into the eye, the kinked end of the hook base plate snaps back down against the hook top plate and produces an audible sound to indicate the fastener is secured.

BRIEF DESCRIPTION OF THE DRAWINGS

Use of the same reference numbers in different figures indicates similar or identical elements.

DETAILED DESCRIPTION OF THE INVENTION

Figure 1:
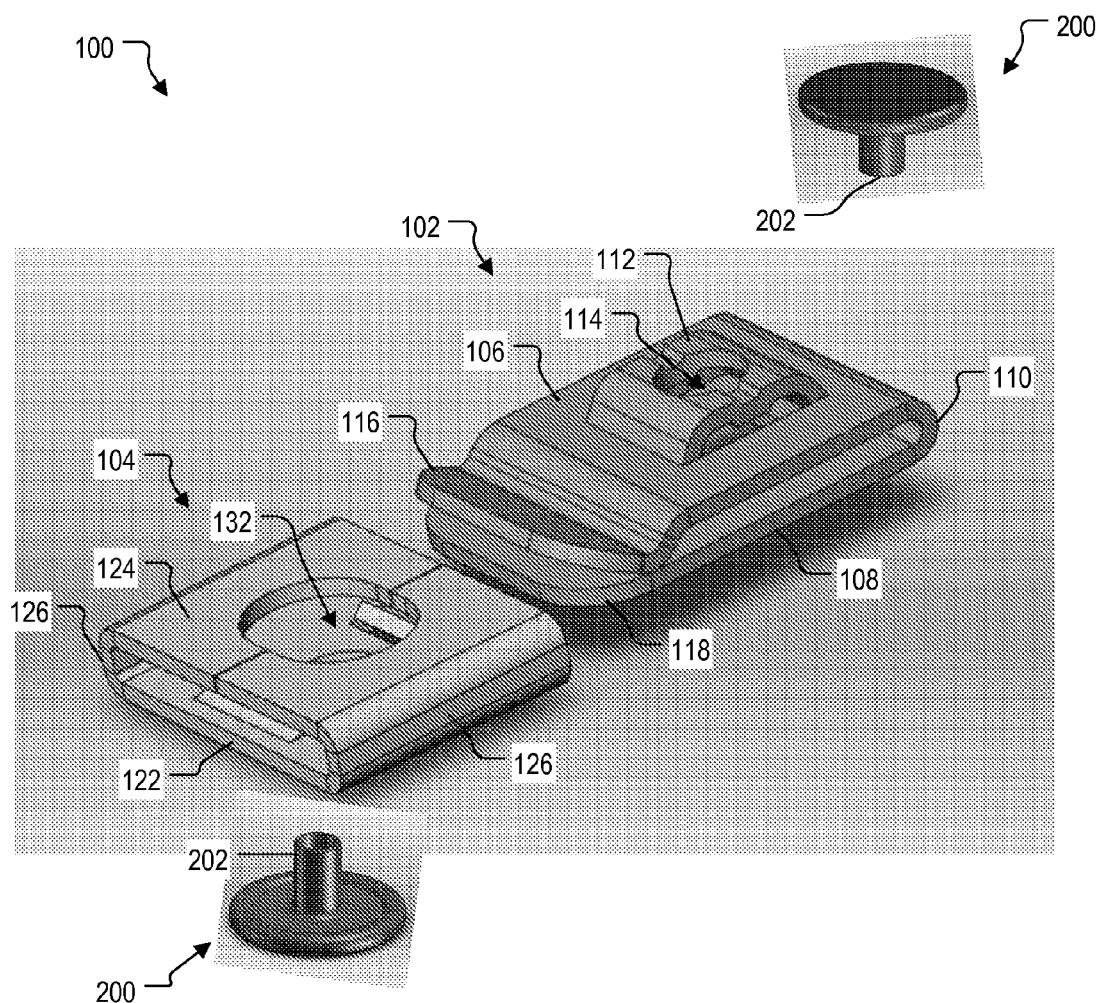
FIG. 1 illustrates a hook and eye fastener in one embodiment of the invention.

FIG. 1 illustrates a hook and eye fastener 100 including a hook 102 and an eye 104 in one embodiment of the invention. Hook 102 is generally shaped like a "U" and includes a hook base plate 106 and a hook top plate 108 jointed by a round section 110. Hook base plate 106 and hook top plate 108 are typically of same length.

Hook base plate 106 includes an optional mount 112 that protrudes outward from hook base plate 106. Mount 112 defines an opening 114 for receiving an eyelet or post 200 to secure hook 102 to a fabric or other materials. Instead of mount 112, hook 102 can be fixed to another object by other methods including bonding and welding.

In one embodiment, hook base plate 106 has a "V" or "U" shaped kinked end 116 that curves toward hook top plate 108 and then away from hook top plate 108. Kinked end 116 is spring-loaded to rest against hook top plate 108. Kinked end 116 typically has a blunt and rounded edge. In another embodiment, hook top plate 108 has kinked end 116 that is spring-loaded to rest against hook base plate 106.

Figure 2:
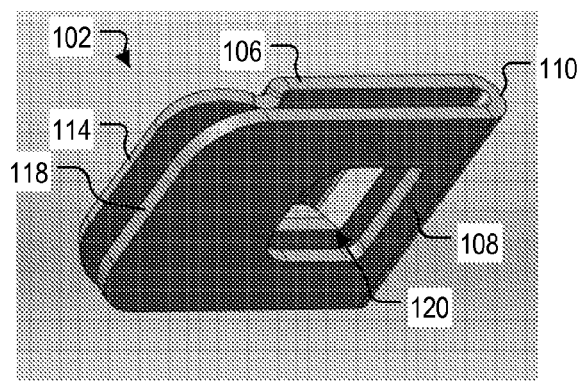
FIG. 2 illustrates a top view of the hook of the fastener of FIG. 1 in one embodiment of the invention.

Hook top plate 108, commonly referred to as the bill, has an end 118 for inserting into eye 104. Referring to FIG. 2, hook top plate 108 defines an opening 120 so a tool (die) can plastically deform a hollow shank 202 of eyelet or post 200 to secure hook base plate 106 to the fabric or other materials. As described above, kinked end 116 of hook base plate 106 is spring-loaded against hook top plate 108.

Figure 3:
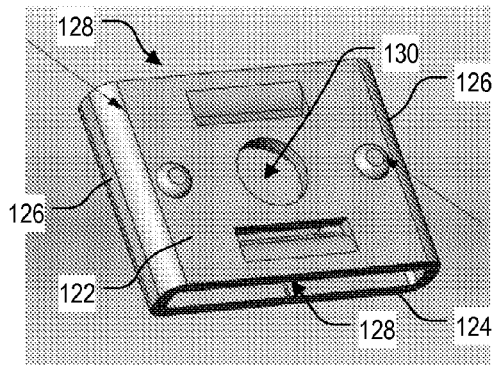
FIG. 3 illustrates a bottom view of the eye of the fastener of FIG. 1 in one embodiment of the invention.

Referring to FIGS. 1 and 3, eye 104 includes an eye base plate 122 and an eye top plate 124 joined on opposing sides by sidewalls 126 to define openings 128 for receiving hook top plate 108 at either end. Eye base plate 122 defines an opening 130 for receiving eyelet or post 200 to secure eye 104 to a fabric and other materials. Eye top plate 124 defines an opening 132 so a tool (die) can plastically deform hollow shank 202 of eyelet or post 200 to secure eye base plate 122 to the fabric or other materials.

Figure 4:
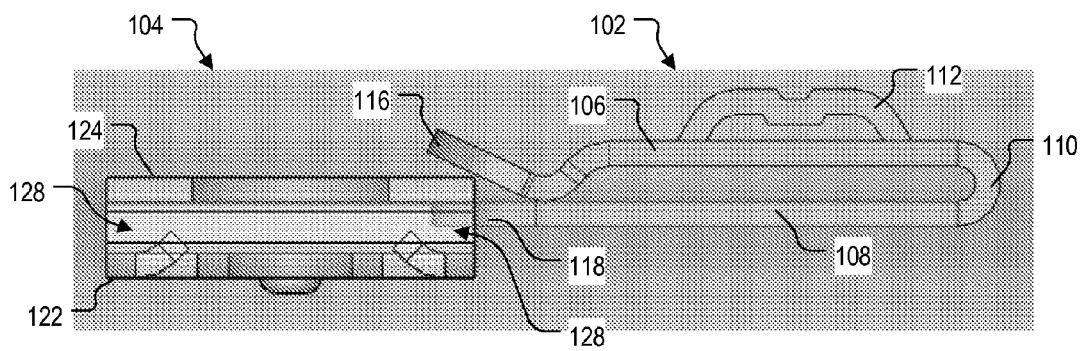
FIGS. 4 and 5 illustrate the insertion of the hook into the eye of the fastener of FIG. 1 in one embodiment of the invention.
Figure 5:
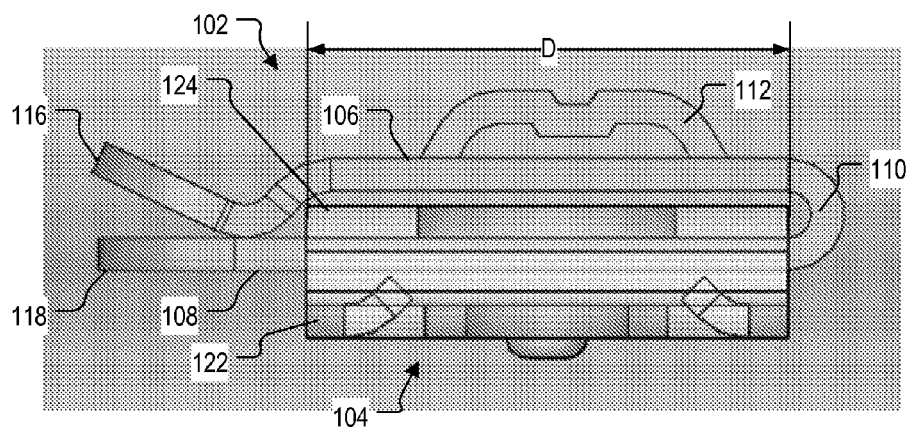

FIGS. 4 and 5 illustrate the insertion of hook 102 into eye 104. When hook 102 is inserted into opening 128, kinked end 116 of hook base plate 106 and end 118 of hook top plate 108 abut a leading edge of eye top plate 124. Kinked end 116 of hook base plate 106 and planar end 118 of hook top plate 108 have the same reach so the kinked end and the planar end are even. As hook 102 is further inserted into eye 104, the slope of kinked end 116 allows the leading edge of eye top plate 124 to push up against hook base plate 106 and push down on the hook top plate 108 so that hook 102 can slide into eye 104. As kinked end 116 is spring-loaded, it snaps back down against hook top plate 108 when kinked end 116 slides past eye top plate 124 after hook 102 is fully inserted into eye 104. This snapback produces an audible sound (e.g., a "pop" or a "click") that indicates to the user that fastener 100 is secured. As shown in FIG. 5, kinked end 116 and round section 110 define a depth "D" of hook 102 that substantially matches the depth of eye top plate 124 so hook 102 and eye 104 remain substantially stationary relative to each other once hook 102 is fully inserted into eye 104.

Once fully inserted, the shape of kinked end 116 prevents hook 102 and eye 104 from becoming unintentionally detached. Specifically, an intentional manual force is needed to push kinked end 116 and end 118 against the opposing leading edge of eye top plate 124 to spread open hook base plate 106 and hook top plate 108 in order to release hook 102 from eye 104. This allows hook and eye fastener to be used on objects that previously cannot use conventional hook and eye fasteners as they require the objects being fastened (e.g., two ends of a bra or a waistband) to be under tension (in one direction only) so the hook and the eye do not become detached.

Hook and eye fastener 100 has many applications. In one embodiment, hook and eye fastener 100 is used to attach a jewelry, a plush toy, or other decorative items to a shoe or other clothing apparels. Hook 102 can be fixed to the decorative item and the eye can be fixed to a shoe or other clothing apparels, or vice versa.

Various other adaptations and combinations of features of the embodiments disclosed are within the scope of the invention. Numerous embodiments are encompassed by the following claims.

The invention claimed is:

1. A hook and eye system, comprising:
   a hook, comprising:
      a hook top plate;
      a hook base plate, wherein one of the hook top plate and the hook base plate comprises a kinked end and the other plate comprises a planar end, the kinked end curves toward the other plate and then curves away from the other plate, the kinked end being spring-loaded to rest on the other plate, the hook base plate and the hook top plate having the same reach so the kinked end and the planar end are even; and an intermediate section joining the hook top plate and the hook base plate; and an eye comprising an eye top plate and an eye base plate joined by sidewalls to define an opening for receiving the hook top plate, wherein:

the slope of the kinked end allows the eye top plate to push up against the hook base plate and push down against the hook top plate when the hook is initially inserted into the eye, and the kinked end snaps back down against the other plate when the kinked end slides past the eye top plate once the hook is fully inserted into the eye; and the kinked end and the intermediate section define a depth of the hook that substantially matches a depth of the eye top plate so the hook and the eye remain substantially stationary relative to each other once the hook is fully inserted into the eye.

2. The system of claim 1, wherein an audible sound is produced when the kinked end of the hook base plate snaps back down against the hook top plate to indicate to a user that the fastener is secured.

3. The system of claim 2, wherein an intentional manual force is needed to push the kinked end and the planar end to spread the hook base plate and the hook top plate in order to release the hook from the eye.

4. The system of claim 1, wherein the hook base plate further comprises a mount, the mount defining an opening for receiving an eyelet or a post.

5. The system of claim 1, wherein the eye base plate defines another opening for receiving an eyelet or a post.

6. The system of claim 1, further comprising:

a decorative item; and an apparel, wherein the hook is fixed to one of the decorative item and the apparel, and the eye is fixed to the other one of the decorative item and the apparel.

7. The system of claim 6, wherein the decorative item and the apparel are not under tension against each other.

8. The system of claim 6, wherein the decorative item is a piece of jewelry and the apparel is a shoe.

* * * * *